United States Patent

[11] 3,565,327

| | | |
|---|---|---|
| [72] | Inventor | Frederick T. Rodley<br>139 W. Main St., Walden, N.Y. 12586 |
| [21] | Appl. No. | 766,574 |
| [22] | Filed | Oct. 10, 1968 |
| [45] | Patented | Feb. 23, 1971 |

[54] TURNED-TOP SHOPPING BAG
2 Claims, 2 Drawing Figs.

[52] U.S. Cl. ................................................. 229/54, 150/12
[51] Int. Cl. .................................................. B65d 33/06
[50] Field of Search ...................................... 229/54, 54 (C), 52; 150/1.7, 12

[56] References Cited
UNITED STATES PATENTS

| | | | | |
|---|---|---|---|---|
| 2,062,617 | 12/1936 | Steen............................. | 229/54(C) |
| 2,346,710 | 4/1944 | Steen............................. | 229/54(C) |
| 3,152,750 | 10/1964 | Bryant........................... | 229/54 |

*Primary Examiner*—David M. Bockenek
*Attorney*—Donald L. Johnson

ABSTRACT: A handled shopping bag having two handles, gusseted sides, a fully turned-top edge and reinforcing patches for each of the handles.

3,565,327

3,565,327

TURNED-TOP SHOPPING BAG

BACKGROUND OF THE INVENTION

Although handled shopping bags have long been known in the art, their design and manufacture have suffered from several major difficulties. Original design shopping bags had the handles located at or near the top of the bag, and the bag opening was the raw edge of the paper material used for the bag preparation. It was found this raw edge was very weak permitting the shopping bag to split easily when loaded or partially loaded and also was a hazard in that the raw paper edge at the opening could cause severe cuts and lacerations in handling and use. Many efforts have been made to alleviate these and other problems by providing serrated edges either totally or partially around the open end of the shopping bag and by folding portions of the shopping bag edge inside the top of the bag in a partial turned-top manner to obtain some reinforcing and greater safety in use and handling. In all attempts thus for, however, to turn the entire top of the shopping bag inside, difficulties have been encountered in the location and placing of the handles for maximum strength and utility. In some efforts to correct these problems, slots were formed in the turned edge of the bag so that the handles could be inserted through the turned edge. This method removed part of the reinforcing around the top and left raw edges close to the handles. Improved modifications were made also by removing portions of the edge in the area where handles were attached so that the edge could be folded inside the bag around the handles. All of these designs were improvements on the original bag; however, they did not meet the problem fully in providing a full turned-top shopping bag without slits or cuts that would utilize the full reinforcing of an unbroken or uncut turned edge.

SUMMARY OF THE INVENTION

This invention comprises a handled shopping bag comprising a tubular body having two opposed sidewall sections, a folded bottom structure, two handles attached to the opposed sidewall sections and a folded top edge completely around the entire opening of the shopping bag to make a completely turned-top handled shopping bag. The folded top edge is prepared by folding the top portion of tubular body inside and adhering the folded portion to the tubular body around the entire top of the bag to provide a continuous smooth reinforced folded top edge substantially free from sharp edges. The two handles are attached to the opposed sidewall sections of the shopping bag tube on the inside over he folded top edge and are covered substantially on the inside of the tube by a reinforcing strip attached to each of the two opposed sidewall sections.

BRIEF DESCRIPTION OF THE DRAWINGS

In the drawings:
In the drawings.

DESCRIPTION OF PREFERRED EMBODIMENTS

Figure 1:
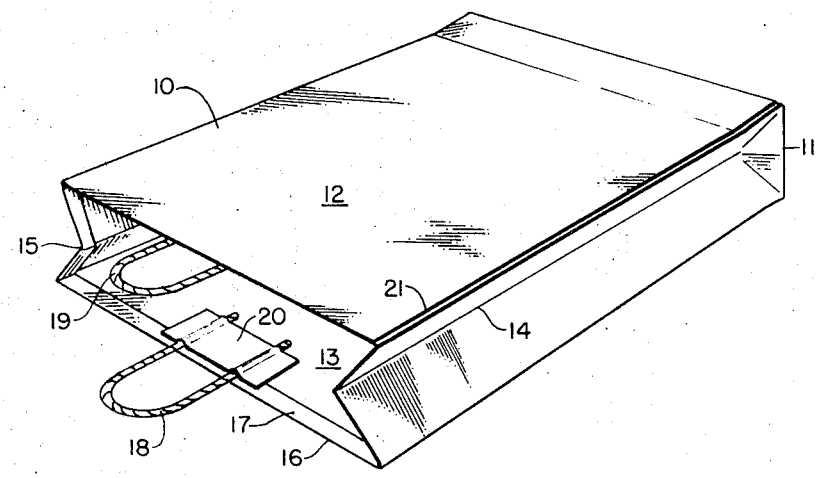
FIG. 1 is a perspective view of a shopping bag with shaped handles attached thereto.
Figure 2:
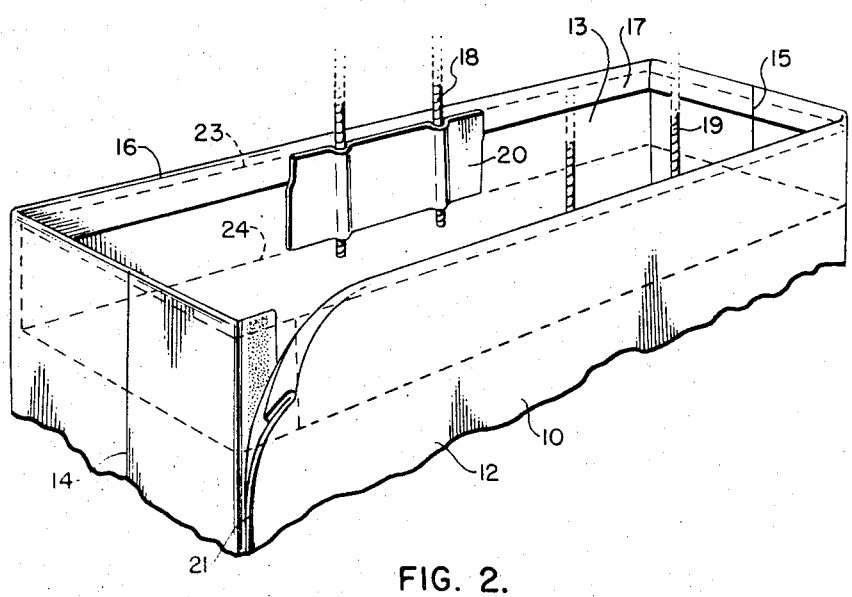
FIG. 2 is a perspective view of the top part of a shopping bag showing a further reinforcing embodiment in dotted lines.

In all instances like numbers refer to like parts. Referring now to FIGS. 1 and 2, shopping bag 10 which may be prepared from any suitable sheet material such as paper, plastic or combinations thereof has a folded and sealed bottom 11, two opposing sidewalls 12 and 13 and gusseted sides 14 and 15. At the top of the bag 16, there is a full turned-top edge 17 which extends completely around the opening of the bag to provide a reinforced opening free from sharp or rough edges. Handles 18 and 19 may be of any suitable shape and may be prepared from cord, twine, twisted paper, plastic or other suitable material. In accordance with this invention, it is preferred that the handles be U-shaped and that one of the handles be slightly larger than the other so that when the bag is in the closed position one handle will nest inside the other one for easy packing and shipment. Each handle is located over the turned-top edge 17 and is reinforced in the mounting by reinforcing patch 20 which may be adhered to the handle and to the reinforcing edge and sidewall of the bag by any suitable means such as an adhesive, stapling or other. The shopping bag tube is sealed along edge 21 as shown more clearly in FIG. 2 by an adhesive or other means along the entire edge.

Another preferred embodiment of this invention is indicated in FIG. 2 by dotted lines 23 and 24 extending around the entire inside of the opening of the shopping bag. This dotted line is to indicate the possible extension of reinforcing patch 20 completely around the inside of the opening or to any partial portion thereof.

As will be seen clearly, the fully turned-top shopping bag may be manufactured completely or partially by hand. If preferred, the blank for shopping bag tube may be cut, the fully turned-top edge prepared on the blank, the handles and the reinforcing patches attached to the blank, the unbottomed tube prepared and then the tube fed to a standard bag-bottoming apparatus well known in the art.

The handled shopping bag of this invention provides a completely smooth edge around the entire opening of the shopping bag which is not sharp and will prevent injury in use. Also, the fully turned-top edge of the shopping bag opening permits maximum use of the shopping bag material to provide reinforcement of the opening to prevent splitting or tearing in the shopping bag in use. Further, the handles are located in a reinforced area of the bag adjacent to the opening and covered with a reinforcing patch to aid in the prevention of the tearing out of handles when the shopping bag is overloaded.

I claim:

1. In a handled shopping bag comprising a tubular body having two opposed sidewall sections, a folded bottom structure, two handles and a folded top edge, the improvement comprising said folded top edge being prepared by folding the top portion of the tubular body inside and adhering it to itself around the entire top of the bag to provide a continuous smooth reinforced folded top edge substantially free from sharp edges, said two handles being attached to said two opposed sidewall sections, one to each sidewall section at a location slightly below said folded top edge and each said two handles being substantially covered inside said bag by a reinforcing strip attached to each said opposed sidewall sections, said reinforcing strip extending about the entire circumference of the tubular body.

2. In a handled shopping bag comprising a tubular body having two opposed sidewall sections, a folded bottom structure, two handles and a folded top edge, the improvement comprising said folded top edge being prepared by folding the top portion of the tubular body inside and adhering it to itself around the entire top of the bag to provide a continuous smooth reinforced folded top edge substantially free from sharp edges, said two handles being attached to said two opposed sidewall sections, one to each sidewall section at a location slightly below said folded top edge and each said two handles being substantially covered inside said bag by a reinforcing strip attached to each said opposed sidewall sections, said reinforcing strips being wider than said infolded top portion and adhered in overlapping relation to said infolded top portion and to an adjoining portion of the corresponding side wall and extending around at least a part of the circumference of the tubular body.